United States Patent
Koester et al.

(10) Patent No.: US 11,860,947 B2
(45) Date of Patent: Jan. 2, 2024

(54) DELETED DATA RESTORATION

(71) Applicant: International Business Machines Corporation, Armonk, NY (US)

(72) Inventors: Michael J. Koester, Hollister, CA (US); Kevin L Miner, Lake City, FL (US); Raymond E. Garcia, San Jose, CA (US); Richard A. Schaeffer, Antioch, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 618 days.

(21) Appl. No.: 16/264,586

(22) Filed: Jan. 31, 2019

(65) Prior Publication Data

US 2020/0250050 A1     Aug. 6, 2020

(51) Int. Cl.
    *G06F 16/903*     (2019.01)
    *G06F 16/16*     (2019.01)

(52) U.S. Cl.
    CPC ...... *G06F 16/90335* (2019.01); *G06F 16/164* (2019.01)

(58) Field of Classification Search
    CPC .................. G06F 16/164; G06F 16/90335
    See application file for complete search history.

(56) References Cited

U.S. PATENT DOCUMENTS

| | | | | |
|---|---|---|---|---|
| 5,590,298 A * | 12/1996 | Kawamoto | ......... | G06F 11/1435 711/3 |
| 5,625,817 A | 4/1997 | Wood et al. | | |
| 6,173,291 B1 * | 1/2001 | Jenevein | ............. | G06F 11/1435 |
| 7,058,664 B1 * | 6/2006 | Hsu | ........................ | G06F 16/20 707/676 |
| 7,516,295 B2 * | 4/2009 | In | ........................ | G06F 12/0246 711/158 |
| 7,549,012 B2 * | 6/2009 | Cernea | .................. | G06F 3/0614 711/103 |
| 8,010,502 B2 * | 8/2011 | Jessee | ................. | G06F 11/1435 707/823 |
| 8,028,120 B2 * | 9/2011 | Mo | ..................... | G06F 12/0246 711/103 |

(Continued)

OTHER PUBLICATIONS

Wikipedia "Direct Access Storage Device" (online) retrieved from the Internet on Dec. 18, 2018 at URL>https://en.wikipedia.org/wiki/Direct-access_storage_device, Total 3 pages.

(Continued)

*Primary Examiner* — Miranda Le
(74) *Attorney, Agent, or Firm* — KONRAD RAYNES DAVDA & VICTOR LLP; William K. Konrad

(57) ABSTRACT

Provided are a computer program product, system, and method for deleted data restoration in accordance with one embodiment of the present description, in which in response to a search request having specified search parameters, data of a deleted data unit is located as a function of specified search parameters. In addition, metadata erased as a result of the deletion operation, is restored as a function of the located data. Accordingly, the previously deleted data unit is undeleted and access to the previously deleted data unit is restored via the restored metadata. Other aspects of deleted data restoration in accordance with the present description are described.

17 Claims, 7 Drawing Sheets

(56) References Cited

U.S. PATENT DOCUMENTS

| | | | | |
|---|---|---|---|---|
| 8,407,192 | B2* | 3/2013 | Memon | G06F 3/0652 |
| | | | | 707/693 |
| 8,838,877 | B2* | 9/2014 | Wakrat | G06F 16/1847 |
| | | | | 711/103 |
| 9,208,817 | B1* | 12/2015 | Li | G06F 3/0631 |
| 9,286,165 | B2* | 3/2016 | Hwang | G06F 11/1435 |
| 9,442,805 | B2 | 9/2016 | Dudgeon et al. | |
| 9,785,517 | B2 | 10/2017 | Hither et al. | |
| 2004/0230702 | A1* | 11/2004 | Sukigara | G06F 11/1417 |
| | | | | 709/253 |
| 2006/0117056 | A1* | 6/2006 | Havewala | G06F 16/10 |
| | | | | 707/999.102 |
| 2006/0280087 | A1* | 12/2006 | Lai | G11B 27/105 |
| | | | | 369/53.24 |
| 2007/0028063 | A1* | 2/2007 | Hars | G06F 11/1469 |
| | | | | 711/162 |
| 2007/0226170 | A1* | 9/2007 | Sun | G06Q 50/18 |
| 2009/0150641 | A1* | 6/2009 | Flynn | G06F 12/1018 |
| | | | | 711/202 |
| 2011/0185112 | A1* | 7/2011 | Goss | G06F 12/0246 |
| | | | | 711/103 |
| 2012/0300331 | A1* | 11/2012 | Deetz | G06F 16/162 |
| | | | | 360/48 |
| 2014/0181037 | A1* | 6/2014 | Pawar | G06F 16/1865 |
| | | | | 707/648 |
| 2014/0337296 | A1* | 11/2014 | Knight | G06F 11/1458 |
| | | | | 707/674 |
| 2016/0337298 | A1* | 11/2016 | Nalliah | G06Q 10/1093 |

OTHER PUBLICATIONS

IBM "Data Set Control Block (DSCB) Types", (online) retrieved from Internet on Dec. 17, 2018 at URL>https://www.ibm.com/support/knowledgecenter/en/SSLTBW_2.3.0/com.ibm.zos.v2r3.idas300/dscbft.htm, Total 5 pages.

IBM "Data Set Control Block (DSCB)", https://www.ibm.com/support/knowledgecenter/en/SSLTBW_2.3.0/com.ibm.zos.v2r3.idad400/dscb99.htmretrieved from the Internet on Dec. 17, 2018 at URL>https://www.ibm.com/support/knowledgecenter/en/SSLTBW_2.3.0/com.ibm.zos.v2r3.idad400/dscb99.htm, Total 2 pages.

IBM "Format Selection" (online) retrieved from the Internet on Dec. 17, 2018 at URL>https://www.ibm.com/support/knowledgecenter/en/SSLTBW_2.3.0/com.ibm.zos.v2r3.idad400/da.htm, Total 4 pages.

IBM "How Found" (online) retrieved from the Internet on Dec. 17, 2018 at URL>https://www.ibm.com/support/knowledgecenter/en/SSLTBW_2.3.0/com.ibm.zos.v2r3.idas300/s3013.htm, Total 7 pages.

IBM, "Track Format" (online), retrieved from the Internet on Dec. 17, 2018 at URL>https://www.ibm.com/support/knowledgecenter/en/SSLTBW_2.3.0/com.ibm.zos.v2r3.idad400/trf.htm, Total 4 pages.

IBM, "VSAM Data Formats", (online), retrieved from the Internet on Dec. 17, 2018 at URL>https://www.ibm.com/support/knowledgecenter/en/SSLTBW_2.3.0/com.ibm.zos.v2r3.idad400/ds9.htm, Total 4 pages.

* cited by examiner

DELETED DATA RESTORATION

BACKGROUND OF THE INVENTION

1. Field of the Invention

The present invention relates to a computer program product, system, and method for deleted data restoration in a computing system having a storage system.

2. Description of the Related Art

In certain computing environments, multiple host systems may configure groups of data often referred to as "data sets" in storage volumes configured in a storage system, such as interconnected storage units or devices, e.g., a Direct Access Storage Device (DASD), Redundant Array of Independent Disks (RAID), Just a Bunch of Disks (JBOD), etc., which are typically controlled by a storage controller coupled to hosts and storage devices. Data sets which may contain a file or many files, are typically comprised of data units often referred to as "extents," which typically may comprise data stored in groupings of smaller data units or subunits often referred to as "tracks." The Z/OS® operating system from International Business Machines Corporation ("IBM") has a Volume Table of Contents (VTOC) to provide to a host, information on data sets of extents configured in the volume, where the VTOC indicates to the host, the location of tracks, extents, and data sets for a volume in storage.

Various data processing tasks are frequently performed at a storage volume level. For example, to avoid loss of data, data stored on a volume (often referred to as a primary volume) may be backed up by copying it to another volume (often referred to as a secondary volume) frequently stored at another geographical location. Accordingly, in the event that data on the primary volume is lost due to data corruption, hardware or software failure, human error or a disaster which destroys or damages the primary volume, the backup data may be retrieved from the secondary volume.

In the z/OS operating system, pointers to the locations of the extents of the data sets are maintained within Data Set Control Block (DSCB) records in the Volume Table of Contents (VTOC). Due to human error, the wrong data set may have been inadvertently deleted, which can result in the loss of valuable user data. When a data set is deleted, the pointers to the data set within the DSCB are destroyed, and the information identifying the location of the user data is lost. The deletion of the wrong data set may be an infrequent event but, when it does occur, the results can be catastrophic depending upon the contents of the data set. If the data has not been backed up to other storage media, the user data has frequently been lost.

SUMMARY

Provided are a computer program product, system, and method for, in one aspect of the present description, deleted data restoration by a computer system such as a host for a data storage system. In one aspect, a search request is received to locate data of a data unit such as a data set, for example, deleted from the storage system. In one embodiment, the data unit was deleted by erasure of metadata identifying the location of data of a deleted data unit, but the data of the deleted data unit nonetheless still resides in storage space of the storage system.

In one aspect, the search request includes specified search parameters which limit the scope of the search for the data of the deleted data unit to improve the efficiency of the search. In response to the search request, data subunits of storage space such as tracks, for example, are scanned to identify storage space locations of scanned storage space meeting specified search parameters of the search request. In one aspect, the scanned storage space may include unallocated storage space.

Upon locating data of a deleted data unit, identifying metadata associated with identified storage space locations is restored to undelete the data unit so that restored identifying metadata remaps identified storage space locations to the data unit of the storage system.

In one embodiment, erased metadata includes erased pointers which prior to erasure, identified a storage space location containing data of the deleted data unit. Metadata is restored by rebuilding erased pointers as a function of identified storage space locations to provide rebuilt pointers identifying a storage space location containing data of undeleted identified storage space records.

In one embodiment, specified search parameters may include a specified data string so that in response to the search request, at least one of allocated and unallocated storage space of the storage system is scanned to identify a storage space location containing the specified data string. In another aspect, specified search parameters may include at least one of a specified record number of a record within a track, specified record position of a record within a track, a specified key length of data, and a specified length of data. In response to an associated search request, at least one of allocated and unallocated storage space of the storage system is scanned to identify storage space tracks having at least one of a specified record number within a track, specified record position within a track, a specified key length of data, and a specified length of data.

In one embodiment, the specified search parameters may be selected from a specified character string, and a specified position of a specified character string within a record. In response to the search request, at least one of allocated and unallocated storage space of the storage system is scanned to identify storage space tracks having storage space records having a specified character string at a specified position within a record.

Other aspects of deleted data restoration in accordance with the present description are described.

DETAILED DESCRIPTION

Figure 1:
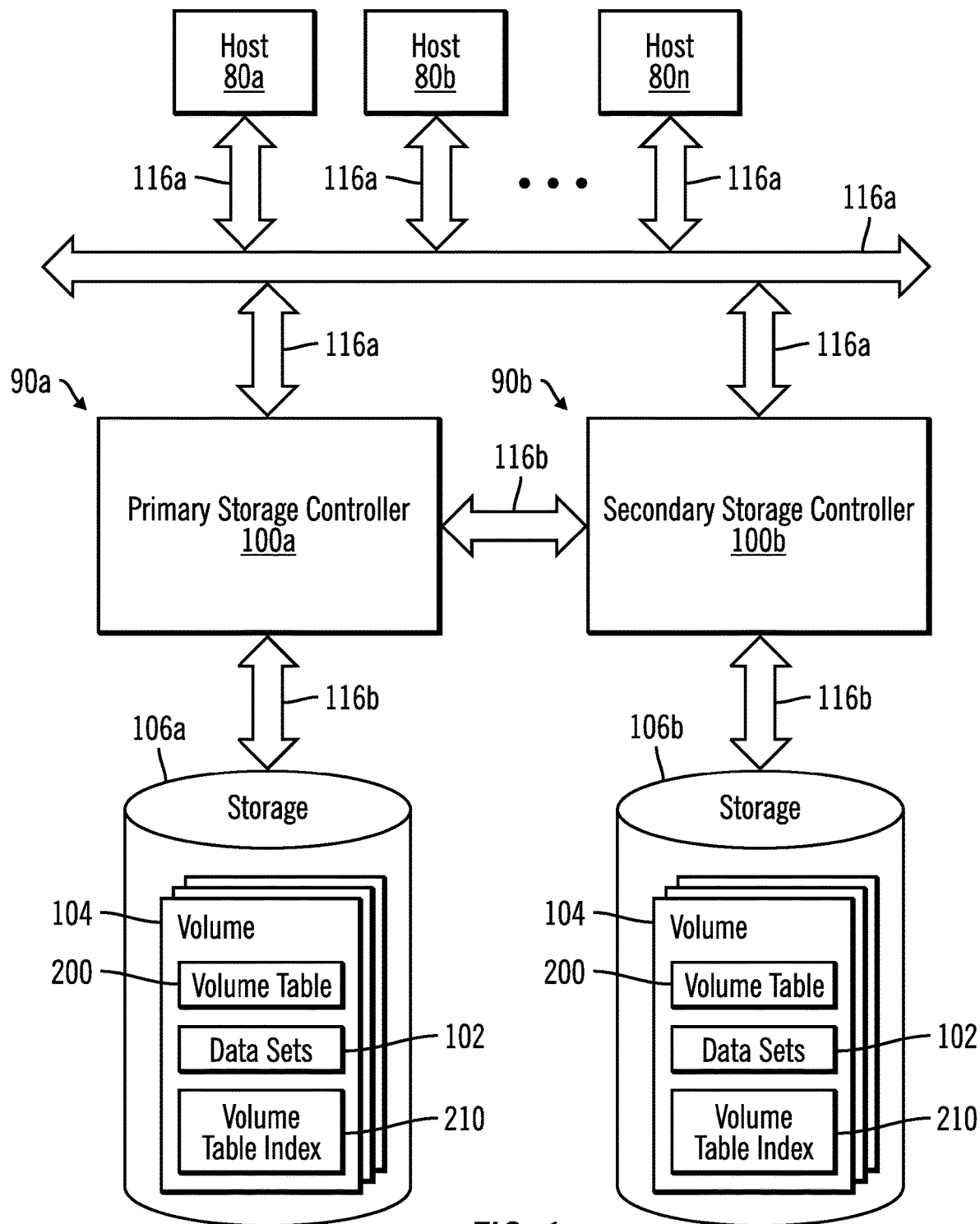
FIG. 1 illustrates an of a storage environment, employing aspects of deleted data restoration in accordance with the present description.

It is appreciated herein that although the pointers to a deleted data set have been deleted, the actual user data of the deleted data set may still exist on the storage volume unless the data itself was also erased in connection with deletion of the data set. It is further appreciated herein that although the storage space containing the data of the deleted data set may have reverted to unallocated storage space because of the deletion process, the location of that actual user data of the deleted data set may still be identified notwithstanding the unallocated status of the storage space of the storage volume.

In one aspect of deleted data restoration in accordance with the present description, deleted data restoration logic is provided to restore a data set or other data unit which has been inadvertently deleted. As a result, a significant improvement in computer technology is provided by deleted data restoration in accordance with the present description.

In one embodiment, a search is conducted to locate user data which still resides on the storage device notwithstanding deletion of the data set or other data unit which pointed to the data. Deleted data restoration logic scans the contents of a storage unit such as a storage volume using specified search criteria. Once the data of the deleted data set is found, pointers or other metadata deleted in connection with the deletion process may be rebuilt. As a result, the deleted data set is in effect undeleted and access to the data is restored through the rebuilt pointer metadata.

For example, deleted data restoration logic can search using specified search criteria, a specified volume or a specified portion of a specified volume such as a specified set of extents, looking for a specified data string, for example. In one aspect of the present description, the deleted data restoration logic can search an entire volume including one or both of allocated and unallocated storage space of the volume. As a result, data missing due to an inadvertent deletion of a data set may yet be located even though the metadata pointers to the data no longer exist and the actual user data resides in unallocated storage space.

In one embodiment, when the data string is found, deleted data restoration logic reports which track or tracks the string was found on. The contents of the located track or tracks may optionally be printed or displayed for the user to verify that the data being looked for has been found. Once the location of the data of the deleted data set is confirmed, pointers or other metadata deleted in connection with the deletion process may be rebuilt and access to the data set is restored through the rebuilt pointer metadata. Thus, a very useful improvement in computer technology is provided.

In one aspect of the present description, deleted data restoration logic provides a user interface to facilitate specifying search rules for searching for data such as a specified data string. For example, in a storage formatted to support a count key data volume, it may be known that a data string to be searched for resides only on the first record of a track, that the data has a key length of zero, and a data length of 27,998 bytes, for example, but the identity of the particular track is unknown. These search parameters may be input and used as search criteria for a scan of the storage on a track by track basis. The deleted data restoration logic in response to these input search parameters, reads the tracks that the user specified only looking at the first record of each track to determine if that first record of the track has a key length of zero and a data length of 27,998 bytes. It is appreciated that limiting a search for user data to specified search criteria or parameters may significantly improve the efficiency of the data search, providing a significant improvement in computer technology. Here too, once the location of the data of the deleted data set is determined, pointers or other metadata deleted in connection with the deletion process may be rebuilt and access to the data set is restored.

Other search criteria may also be specified. For example, it may be known that a particular data string to be located may only reside on a given record where the first eight characters of the record have a specific character string within the given record, but the contents of the data string may be unknown as well as the identity of the track. The deleted data restoration logic in response to these input search parameters, reads tracks by only looking at the specified record of each track to determine if that record being read has the specified character string at the specified position within the given record. In this manner, the track or tracks containing a record in the specified record position and containing the specified character string in the specified position are determined and as a result, the location of the data of the deleted data set is also determined. Pointers or other metadata deleted in connection with the deletion process may be rebuilt as a function of the located data and access to the data set is restored.

In one embodiment, selection of search parameters and confirmation of data location may be performed manually by a user. Alternatively, search parameters may be generated automatically in whole or in part, and the location of the data of a deleted data set or other data unit may be determined automatically, in whole or in part.

A system of one or more computers may be configured for deleted data restoration in accordance with the present description, by virtue of having software, firmware, hardware, or a combination of them installed on the system that in operation causes or cause the system to perform deleted data restoration in accordance with the present description. For example, one or more computer programs may be configured to perform deleted data restoration by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software-controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements and may be embodied in any suitable form and organized within any suitable type of data structure. The operational data may be collected as a single data set, or may be distributed over different locations including over different storage devices.

A storage unit such as a DASD storage device, for example, may be subdivided into smaller units (or sub-units) of storage such as volumes. A volume may in turn be subdivided into smaller units (or sub-units) of storage such as extents which may in turn be subdivided into still smaller units (or sub-units) of storage such as tracks. Each track typically is made of still smaller storage units (or sub-units) referred to as records. Other known storage units and sub-units of storage include storage allocation units, blocks, cylinders, gigabytes, megabytes, etc., the relative sizes of which may vary. For example, a storage allocation unit is typically on the order of 16 megabytes in size or 21 cylinders in size, depending upon the appropriate unit of measure. In that these storage units and storage sub-units are configured to store data, they may also be referred to as data units or data sub-units, as appropriate.

A data set is a collection of data which may contain a file or many files, and is typically comprised of a collection of extents, each of which is a grouping of tracks which are typically physically located in physically contiguous storage areas of the storage unit. Thus, in the context of storage volumes, each data extent of a data set typically comprises data stored in a plurality of physically contiguous tracks of a particular storage volume.

Metadata describing the data stored within a storage unit such as a storage volume, may be stored in a storage unit data structure such as, for example, a Volume Table of Contents (VTOC) which is typically stored in the storage volume itself. The VTOC metadata is typically formatted in a manner suitable for the host to read the VTOC and obtain the metadata stored in the VTOC.

Thus, the Z/OS® operating system from International Business Machines Corporation ("IBM") has a Volume Table of Contents (VTOC) to provide to a host, information on data sets of extents configured in the volume, where the VTOC indicates to the host, the location of tracks, extents, and data sets for a volume in storage. Storage locations of a storage unit are allocated to a data set for storing the extents of the data set. The location of each extent of a data set having data stored in a particular volume is identified by pointers in the VTOC which map each data set extent to a range of storage locations in the storage unit. Storage locations which are not allocated to any data set are referred to herein as unallocated, and are free and available to be assigned to a data set.

In the z/OS operating system, pointers to the data sets are maintained within Data Set Control Block (DSCB) records in the Volume Table of Contents (VTOC). Due to human error, the wrong data set may have been inadvertently deleted, which can result in the loss of valuable user data. When a data set is deleted, the pointers to the data set within the DSCB are destroyed. In addition, the storage locations which stored the deleted data set revert back to unallocated status. As a result, the user data of the wrongly deleted data set may be lost.

In one aspect of deleted data restoration in accordance with the present description, it is appreciated that the actual user data may yet remain on the storage unit notwithstanding deletion of the pointers which identified the locations of the data set which contained the user data. It is further appreciated that the actual user data may yet remain on the storage unit notwithstanding that the storage locations which stored the deleted data set may have reverted to unallocated status. As described in greater detail below, data restoration logic scans a storage unit or units including unallocated storage locations, to identify the locations of lost data and restore accessibility to the data of a data set previously inadvertently deleted from a storage unit. For example, pointers which were destroyed by the data set deletion process may be reconstructed as a function of the locations of data found as a result of the scan.

In some embodiments, a storage unit such as a storage volume, may be a virtual storage volume having a plurality of virtual storage units. One example of a virtual storage unit is a virtual storage allocation unit. Each virtual storage allocation unit is mapped by the storage controller to an actual physical storage allocation unit in a particular storage performance tier. The mapping of each virtual allocation unit of each data extent stored in a virtual storage volume, is typically contained within the metadata for that data set in the VTOC data structure of the particular virtual storage volume.

In many storage controllers, the data of a data set is stored in data extents, each of which may be located in different available storage spaces. As a consequence, the data of a single data set may be dispersed over several different storage units such as storage volumes. Accordingly, deleted data restoration in accordance with the present description, may be applied to multiple storage units such as storage volumes, to locate the user data of the deleted data set dispersed over multiple volumes, and restore the metadata and hence the accessibility of the data set to undelete a data set stored in multiple storage volumes.

Figure 2:
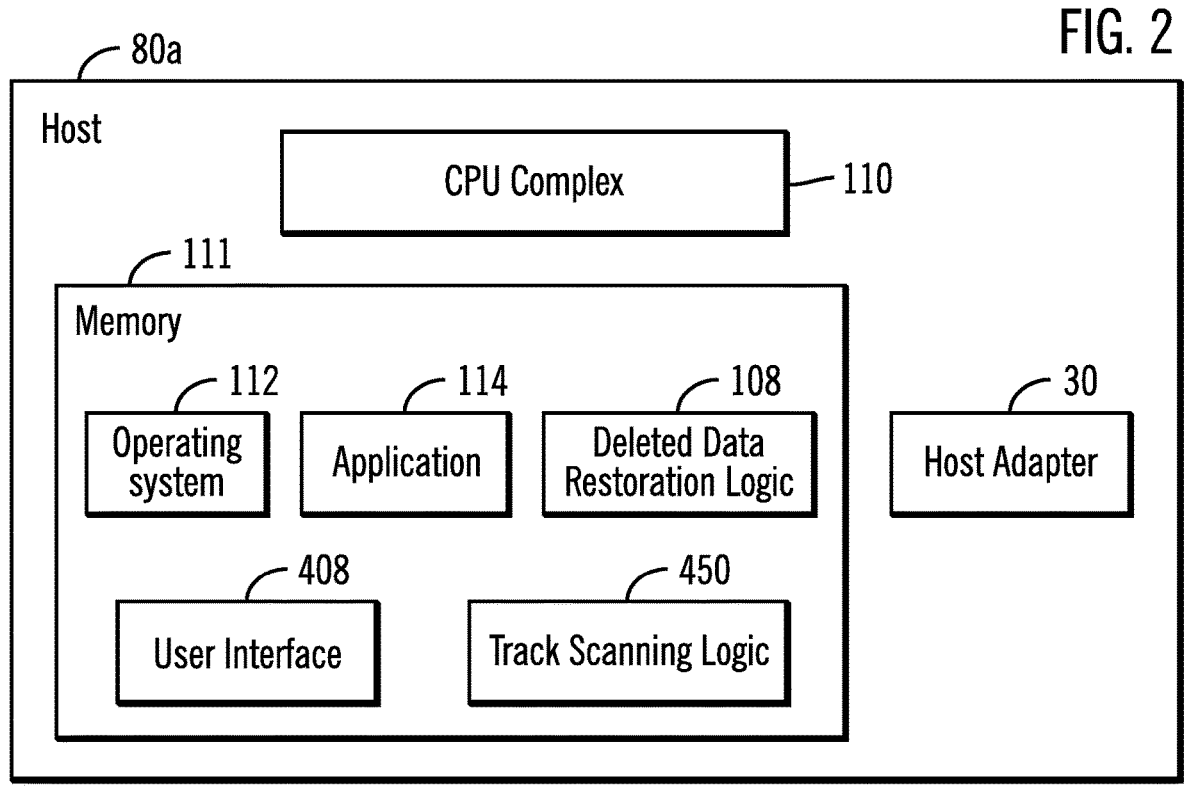
FIG. 2 illustrates another embodiment of a host employing aspects of deleted data restoration in accordance with the present description.
Figure 3:
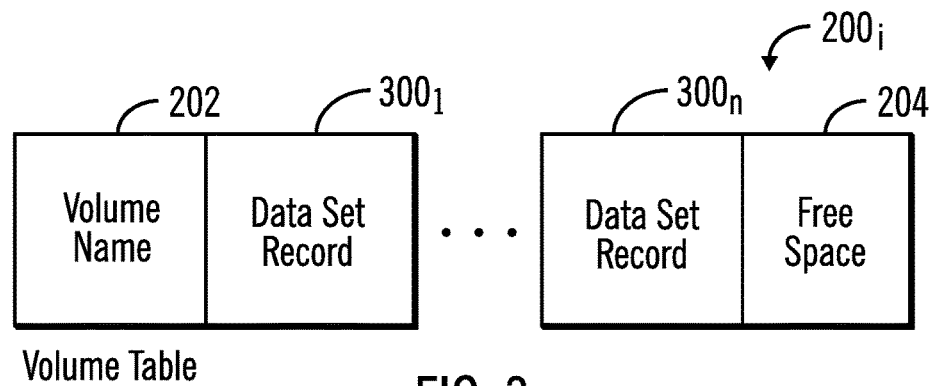
FIG. 3 illustrates an embodiment of a known volume table.

FIGS. 1-3 illustrate an embodiment of a computing environment employing deleted data restoration in a data storage system in accordance with the present description. A plurality of hosts 80a (FIGS. 1, 2), 80b . . . 80n may submit Input/Output (I/O) requests to one or more data storage systems 90a, 90b, to read or write data in storage. Each data storage system 90a, 90b includes a storage controller or target control unit 100a, 100b, respectively, that manages access to data sets 102 configured in storage volumes 104 in a storage 106a, 106b, by one or more hosts 80a, 80b . . . 80n.

As described in greater detail below, one or more of the hosts 80*a*, 80*b* . . . 80*n* include deleted data restoration logic 108 (FIG. 2) which is configured to scan a storage unit or units to identify the locations of lost data and restore accessibility to previously deleted data sets which had been inadvertently deleted from a storage 106*a*, 106*b*. In one embodiment, the data restoration logic 108 may provide a user the capability to specify rules that could be used for the searching for a specified data string, for example, which is known to exist in the user data of the deleted data set.

In some embodiments, the location of each extent of a non-deleted data set stored in a storage volume is identified in metadata of a data structure such as a VTOC which is formatted in a manner to be understandable to logic of the host. However, it is appreciated that in these and other embodiments, deleted data restoration as described herein may be undertaken by a storage controller instead of the host, or a combination of both the storage controller and the host, for example, depending upon the particular application. Accordingly, one or both of the host and the storage controller may have logic configured to scan a storage unit or units to identify the locations of lost data and restore accessibility to the previously deleted data sets or other data units. In some embodiments, the host, storage controller or both may be configured to read and generate metadata including extent location metadata to restore inadvertently deleted data sets or other such data units.

The hosts 80*a*, 80*b* . . . 80*n* may be separate physical devices or may be virtual devices implemented using assigned resources of partitions of a server, for example. In a similar manner, the storage controllers 100*a*, 100*b* of the data storage systems 90*a*, 90*b* may be separate physical devices or may be virtual devices implemented using assigned resources of partitions of one or more servers, for example.

In the illustrated embodiment, the data storage system 90*a* is a primary data storage system and the data storage system 90*b* is a secondary data storage system in which data stored on the primary data storage system 90*a* by a host is mirrored to the secondary data storage system 90*b*. Although the embodiment depicted in FIG. 1 depicts a single secondary data storage system 90*b*, it is appreciated that a primary data storage system 90*a* may have more than one secondary data storage system.

Data backup systems can provide continuous availability of production data in the event of a sudden catastrophic failure at a single point in time or data loss over a period of time. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy. Although FIG. 1 depicts a data backup system, it is appreciated that a computing environment employing deleted data restoration in a data storage system in accordance with the present description may be applied to any computer system having data storage.

A typical host as represented by the host 80*a* of FIG. 2 includes a CPU complex 110 and a memory 111 having an operating system 112, and one or more applications 114 that cooperate to read data from and write data updates to the storage 106*a*, 106*b* via a storage controller 100*a*, (FIG. 1), 100*b*. An example of a suitable operating system is the z/OS operating system. It is appreciated that other types of operating systems may be employed, depending upon the particular application. The deleted data restoration logic 108 may be separate from the operating system of the host or may be included within the host operating system or an application, for example. The deleted data restoration logic 108 may be implemented with hardware, software, firmware or any combination thereof.

The I/O requests may be transmitted to the data storage systems 90*a*, 90*b* over a network which includes a network 116*a* (FIG. 1). The network 116*a* may include one or more data links and switches of a connection fabric to provide a connection path through the connection fabric between a selected host 80*a*, 80*b*, 80*n* a selected target such as a data storage system 90*a*, 90*b*. The hosts and the data storage systems 60*a*, 90*b* communicate in accordance with the zHyperlink, Fibre Channel Protocol (FCP), Fibre Connection (FICON), enterprise system connection (ESCON) or any other suitable connection or protocol, depending upon the type of communication link.

The storage 106*a*, 106*b* may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The storage controllers 100*a*, 100*b* communicate with the storage 106*a*, 106*b* and each other via connections 116*b*. The connections 116*a*, 116*b* each may comprise one or more networks, such as a Local Area Network (LAN), Storage Area Network (SAN), Wide Area Network (WAN), peer-to-peer network, wireless network, etc. The connections 116*a*, 116*b* may be based upon a particular host attachment protocol such as zHyperlink, Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Each storage volume 104 includes metadata concerning the data sets 102 stored in one or more storage unit data structures of each storage volume 104 such as a storage volume table 200 having information on the storage volume 104 to which it pertains, including extent location metadata for each data set 102 having data stored in the particular storage volume 104. The extent location metadata may be used to identify the data extents of each data set 102, and to locate the physical storage locations of each data extent of the data sets 102 having data stored in the particular storage volume 104. In one embodiment, each extent is stored in contiguous tracks or physical addresses in the storage 106*a*, 106*b*.

The storage volume table 200 may be stored in the storage volume 104, such as in the first few records of the storage volume, for example starting at track 0 and cylinder 0 of the storage volume 104. Alternatively, the storage volume table 200 may be located at a different track and cylinder number than the first one. In IBM z/OS operating system implementations, the storage volume table 200 may comprise a storage volume table of contents (VTOC) which includes extent location metadata describing locations of data sets in the storage volume 104, such as a mapping of tracks or extents in the data sets to physical storage locations in the storage volume.

It is appreciated that storage volume metadata may include metadata in other formats describing various aspects of the data sets, files or other data units stored in the storage volume. For example, the storage volume table 200 may comprise a file allocation table stored separately from the storage volume 104 or within the storage volume 104. In other embodiments, the storage volume table 200 may comprise other types of data structures that provide pointers or a mapping of data to storage locations, either logical, virtual and/or physical storage locations.

In IBM z/OS operating system implementations, the storage volume table 200 provides pointers or a mapping of tracks or extents to data sets 102 in the storage volume 104. In various embodiments, the storage volume table 200 may further include metadata such as a storage volume name and data set records indicating data sets having data extents configured in the storage volume 104.

FIG. 3 illustrates an example of a known arrangement of information maintained in a storage unit data structure such as an instance of a known storage volume table $200_i$ for one storage volume $104_i$. It is appreciated that metadata for a storage unit in accordance with the present description may have other arrangements, depending upon the particular application.

The storage volume table instance $200_i$ of this example includes a storage volume name 202, also known as a storage volume serial number, e.g., a VOLSER, that provides a unique identifier of the storage volume. The storage volume name 202 may be included in the name of the storage volume table $200_i$ in a storage volume 104. The storage volume table $200_i$ instance further includes one or more data set records $300_1 \ldots 300_n$ indicating data sets having data extents of tracks configured in the storage volume 104 represented by the storage volume table $200_i$. In embodiments where the operating system 112 comprises an operating system such as the z/OS operating system, the data set records may comprise data set control blocks.

Each data set record of a VTOC may have information for each data set 102 in a storage volume 104, including the data units (e.g., extents, tracks, blocks, etc.) assigned to the data set 102. Tracks may be stored in data extents, which provide a mapping or grouping of tracks in the storage volume 104.

Figure 4:
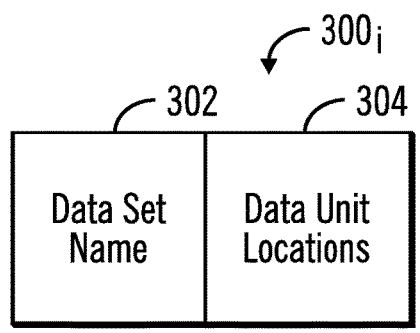
FIG. 4 illustrates an embodiment of a known data set record.

FIG. 4 illustrates an example of an instance of a known data set record $300_i$, such as one of the data set records $300_1 \ldots 300_n$ included in the storage volume table $200_i$. Each data set record $300_i$ contains metadata 302, 304 pertaining to a particular data set 102 (FIG. 1). In one embodiment, the metadata may be arranged in fields including for example, a field 302 identifying a name for the particular data set, and one or more fields 304 identifying the locations of data units such as tracks, extents or storage allocation units, for example, which have been allocated to the data set of the record $300_i$. Thus, in one embodiment, the allocation of data units such as tracks or extents to a data set having data stored within a particular volume is described within the VTOC on each volume. In one embodiment, the VTOC contains Format1/Format3 Data Set Control Block (DSCB) chains that describe the extents on the volume that a data set resides within. It is appreciated that a data set record may have additional or different fields depending upon the particular application.

In one embodiment, pointer information stored in the location field 304 which identifies locations of data units such as tracks, extents or storage allocation units, for example, which have been allocated to the data set of the record $300_i$, is destroyed when the data set of the data set record $300_i$ is deleted. As a result, the user data of the deleted data set can no longer be located using the data set record of the VTOC. Deleted data restoration in accordance with the present description, locates user data of deleted data sets and restores the pointers or other location information destroyed when the data set was inadvertently deleted.

The storage volume 104 may further include a storage volume table index 210 (FIG. 1) that maps data set names to data set records in the storage volume table 200. In one embodiment, the metadata may include a mapping of the data extents of each data set 102 (or data set portion) stored within the storage volume 104, to physical allocation units which may be identified by cylinder and/or track numbers, for example.

It is appreciated that the metadata describing various aspects of the data set of the record $300_i$ may include other fields, either in addition to or instead of those depicted in this example, depending upon the particular application. The data unit location information 304 may be expressed as disk, cylinder, head and record location (CCHHR), or other formats, either virtual or physical. Terms such as tracks, data units, blocks, storage allocation units, etc., may be used interchangeably to refer to a unit of data managed in the storage volume 104.

The storage volume table $200_i$ (FIG. 4) in one embodiment may further include one or more free space records 204 identifying ranges of available tracks in the storage volume 104 in which additional data set records $300_{n+1}$ or extents can be allocated to data sets. Thus, the tracks identified by the free space records 204 have not yet been allocated, and therefore may be classified as unallocated. In accordance with the present description, these unallocated tracks may be searched by the deleted data restoration logic 108 to locate user data of deleted data sets, in some embodiments.

In one embodiment, a VTOC may include, for example a map, such as the VTOC Pack Space Map (VPSM), for example, which maps free areas of storage that have not been allocated to a data set. The host application may be configured to read the free space map of the VTOC to identify unallocated storage locations for searching for user data of deleted data sets to achieve deleted data restoration.

Figure 5:
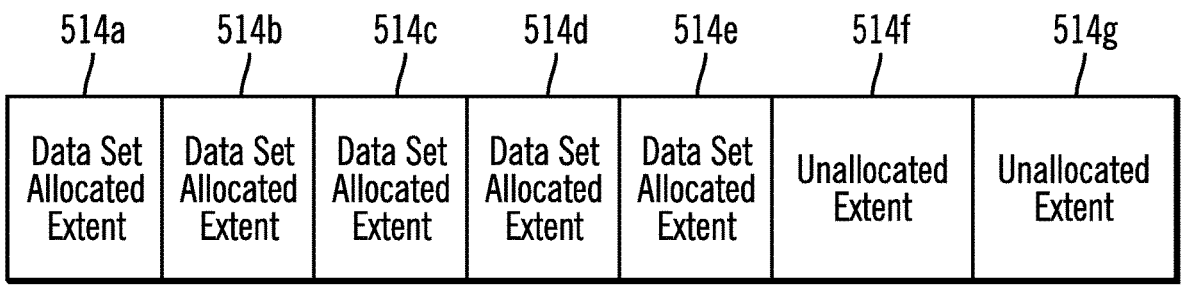
FIG. 5 illustrates an embodiment of a known extent allocation map.

FIG. 5 shows an example of a known map 510 such as a VTOC Pack Space Map (VPSM), for example, in which a map element such as a bit or bits for each data unit such as an extent, for example, indicates whether or not the associated extent has been allocated to a data set. Thus, the map 510 depicts for example, a set of map elements 514a, 514b . . . 514g, each representing a data extent. In the example of FIG. 5, the map elements 514a-514e indicate that the associated data extents represented by the map elements 514a-514e have each been assigned to a data set and thus each has been allocated to a data set. Conversely, in the example of FIG. 5, the map elements 514f-514g indicate that the associated data extents represented by the map elements 514f-514g have each not been assigned to a data set and thus the associated data extents represented by the map elements 514f-514g remain unallocated.

Accordingly, in one embodiment, a metadata map such as the map 510 of data units such as data extents or data tracks may be read from the metadata of the storage volume by the deleted data restoration logic 108 (FIG. 2) to determine if a particular data unit such as an extent has been allocated to a data set. It is appreciated that the manner of determining whether a unit or sub-unit of storage has been allocated to a data set or remains unallocated may vary, depending upon the particular application. In accordance with the present description, these unallocated units of storage such as extents or tracks, for example, may be searched by the deleted data restoration logic 108 to locate lost user data and restore accessibility to found user data through metadata reconstruction in the volume table.

Figure 6A:
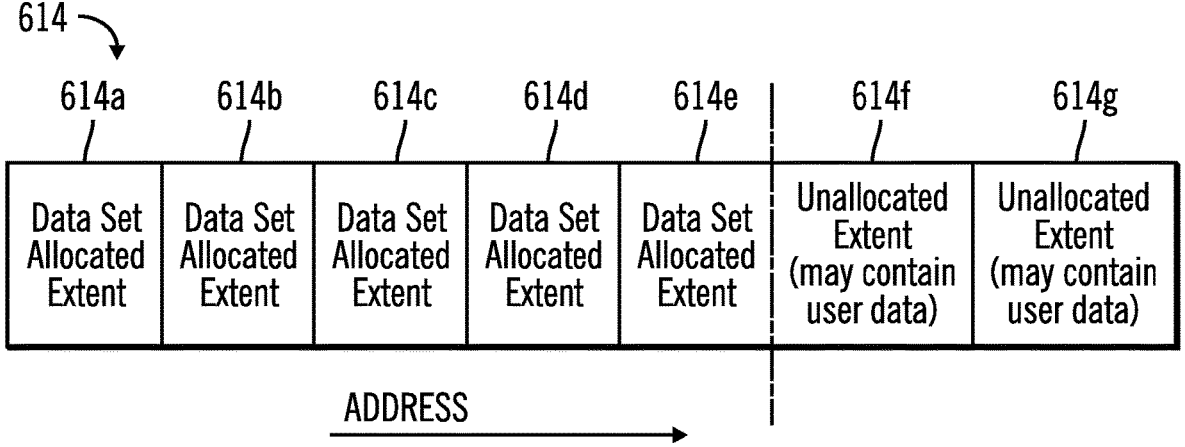
FIG. 6a illustrates an embodiment of a plurality of known extents.

For example, FIG. 6a depicts a known example of a plurality 614 of contiguous data extents 614a, 614b . . . 614g of a storage volume 104. The field 304 (FIG. 4) of the record 300$_i$ for the data set may indicate that the extents allocated to the particular data set includes extents 614a-614e but not extents 614f, 614g which have not been allocated to a data set. In accordance with the present description, it is appreciated that the unallocated extents 614f, 614g may contain user data of an erroneously deleted data set. These unallocated tracks may be searched by deleted data restoration logic 108 (FIG. 2) to locate lost user data and restore accessibility to the found user data by reconstructing pointer metadata destroyed by an inadvertent data set deletion.

Figure 6B:
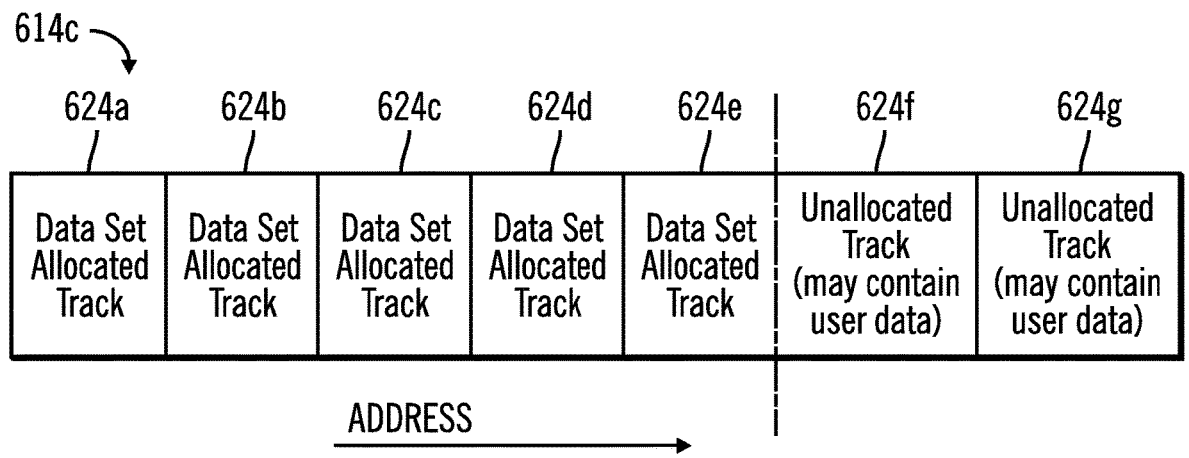
FIG. 6b illustrates an embodiment of a known extent.

FIG. 6b depicts a portion of a known extent 614c as represented by a plurality of contiguous data track 624a, 624b . . . 624e of the extent 614c which have been allocated to a data set. Conversely, the tracks 624f-624g are unallocated tracks. In accordance with the present description, it is appreciated that the unallocated tracks 624f-624g may contain user data of an erroneously deleted data set. These unallocated tracks may be searched by the deleted data restoration logic 108 (FIG. 2) to locate lost user data and restore accessibility to the found user data by reconstructing pointer metadata destroyed by an inadvertent data set deletion.

Figure 6C:
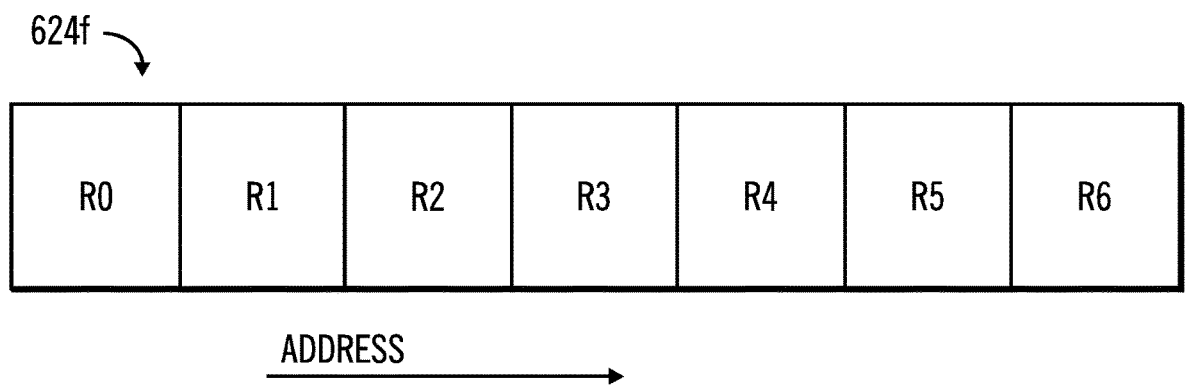
FIG. 6c illustrates an embodiment of a known track.

FIG. 6c depicts a portion of a known track 624f as represented by a plurality of contiguous records R0, R1 . . . R6 which prior to deletion of a data set, were allocated to that data set but are now unallocated as a result of a deletion process which erroneously deleted the data set. In accordance with the present description, it is appreciated that the records of this unallocated track may contain user data of an erroneously deleted data set. The records of the unallocated track may be searched by the deleted data restoration logic 108 (FIG. 2) to locate lost user data and restore accessibility to the found user data by reconstructing pointer metadata destroyed by an inadvertent data set deletion. It is appreciated that in addition to unallocated records, tracks, extents, etc., allocated records, tracks, extents and other allocated storage units may be searched as well to locate lost user data of erroneously deleted data sets, depending upon the particular application.

Figure 7:
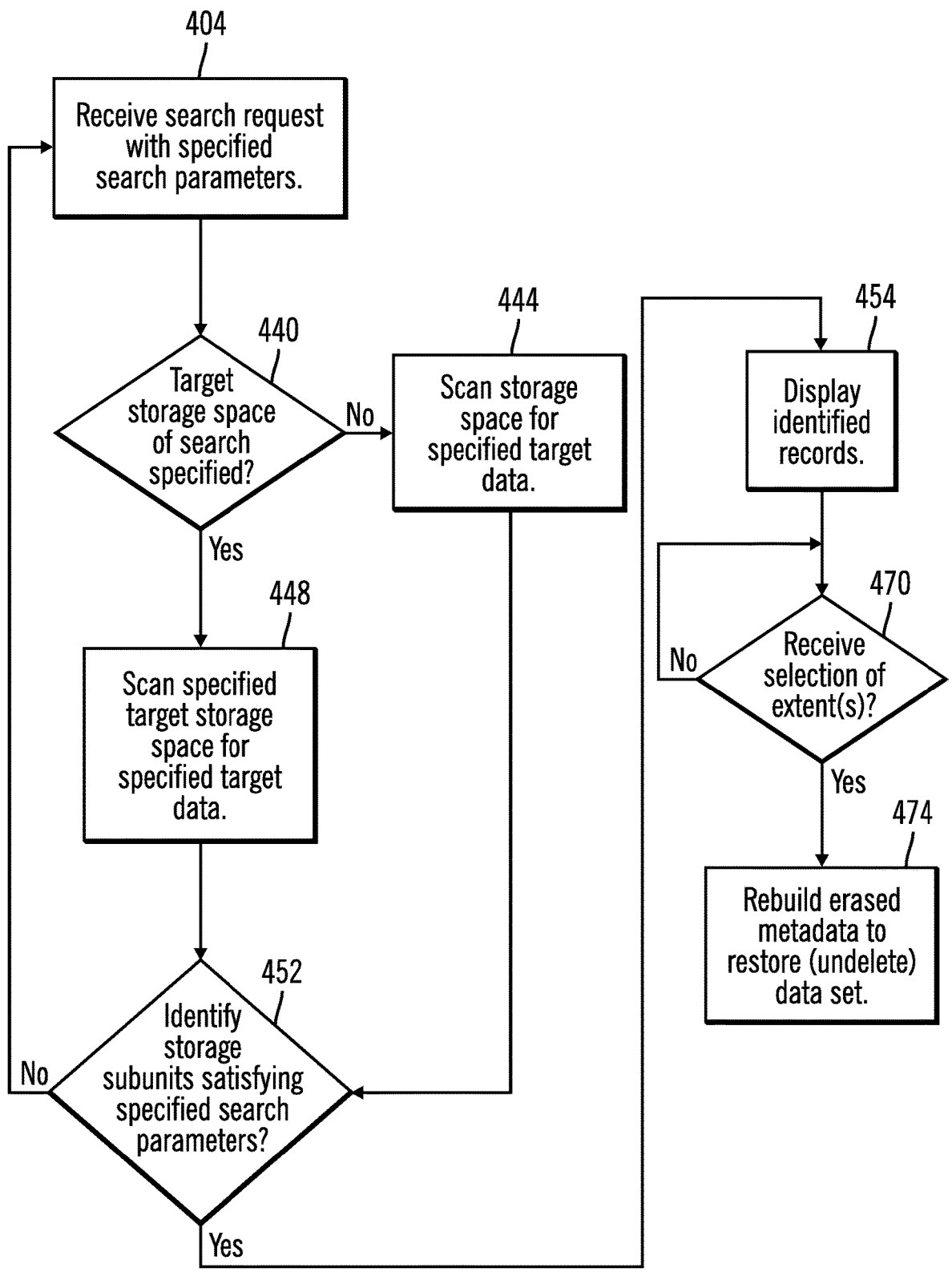
FIG. 7 illustrates an embodiment of operations of a host employing deleted data restoration in accordance with the present description.

FIG. 7 illustrates an embodiment of operations performed by a deleted data restoration logic 108 (FIG. 2) in accordance with the present description. In one operation, the deleted data restoration logic 108 receives (block 404, FIG. 7) a search request to locate and identify data of a data unit such as a data set, for example, which was deleted from the storage system. In one embodiment, deletion of a data set causes erasure of identifying metadata associated with the deleted data set but the actual user data of the deleted data set may yet reside in storage space of the storage system. One example of such identifying metadata are pointers which prior to being destroyed by the deletion operation, were stored in a volume table of contents (VTOC) of a volume and indicated the storage locations of the extents containing the user data of the data set. Upon erasure of these pointers, the VTOC no longer provides the location information for the deleted data set.

In one embodiment, the search request includes search parameters to aid in the location of the user data of the deleted data set. The search request parameters may be specified by a user though a suitable user interface such as the user interface 408 (FIG. 2) of the deleted data restoration logic 108. Alternatively, in some embodiments, search request parameters may be provided automatically by the deleted data restoration logic 108.

Figure 8:
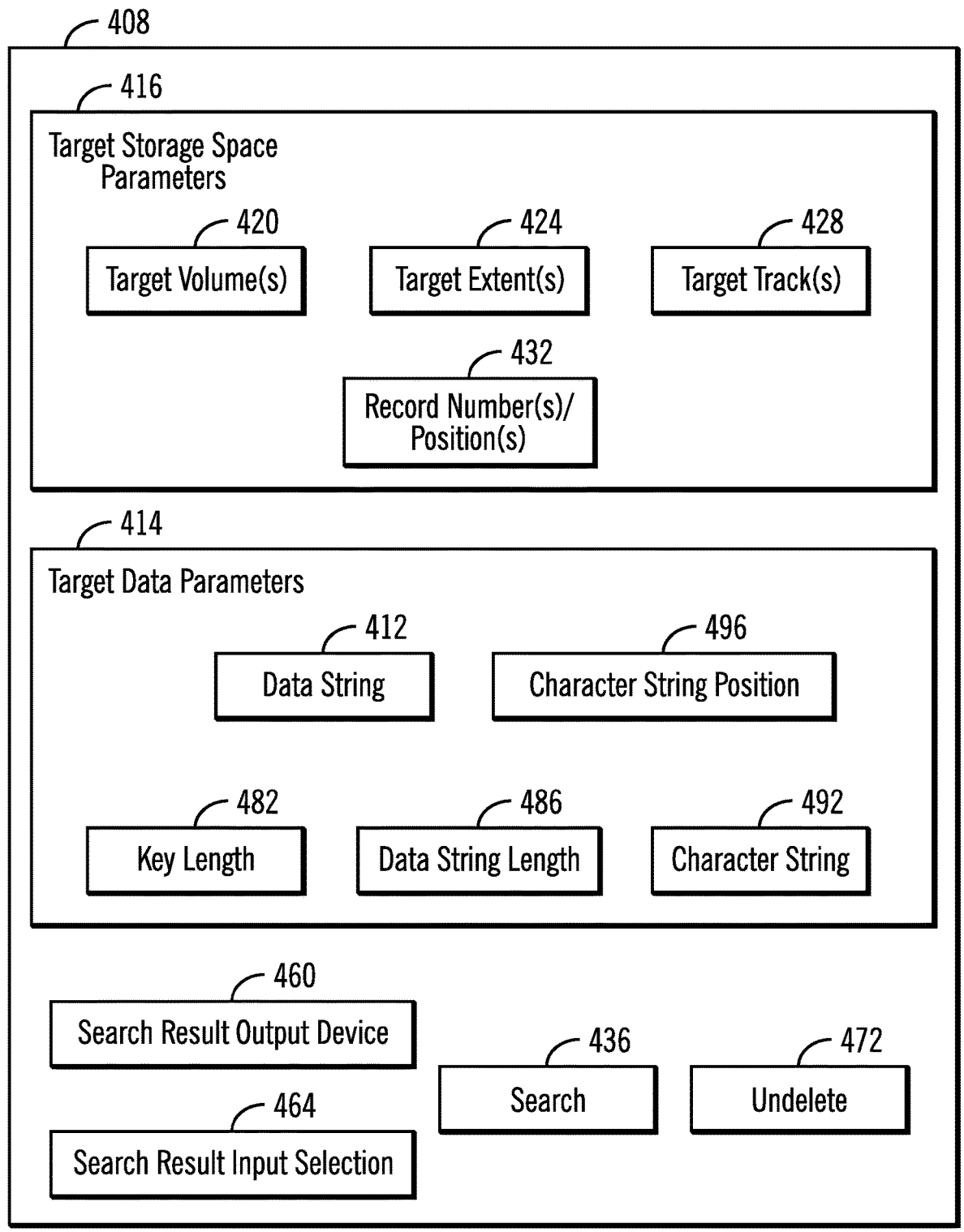
FIG. 8 illustrates an embodiment of a user interface of a host employing deleted data restoration in accordance with the present description.

FIG. 8 shows in greater detail one example of a user interface 408 which includes multiple fields by which a user may specify various search parameters associated with the search request. For example, the user interface 408 includes a target data string field 412 of a set of target data parameter fields 414, by which the user may specify a target data string of the search. In this example, the user interface 408 further includes a set of target storage space fields 416 by which the user may specify one or more target storage space parameters to limit the search for the specified target data to the portion of the storage space identified by the specified target storage space parameter or parameters. In one embodiment, the fields 416 of the target storage space parameters may include, for example, a target volume(s) field 420, a target extent(s) field 424, a target track(s) field 428 and a record number(s) or position(s) field 432 by which a user may specify one or more of a target volume or volumes (field 420), a target extent or extents (field 424), a target track or tracks (field 428) and a target record number or numbers or position or positions (field 432). If multiple target storage subunits such as volumes, tracks, extents or records, for example, are specified, they may specified in the form of ranges of volumes, tracks, extents or records, respectively, as appropriate. Further, multiple target storage subunits such as volumes, tracks, extents or records, for example, may be specified as collections or sets of individual or ranges of volumes, tracks, extents or records, respectively, as appropriate. Although the target storage space parameters are described in one embodiment as including one or more of volume, extent, track and record parameters, it is appreciated that other target storage space units or subunits may be utilized, such as cylinders, blocks, etc.

Once the search parameters have been specified, a search request may be generated. In the example of FIG. 8, the user interface 408 includes a search request field 436 by which a user may manually initiate a search request. Alternatively, in some embodiments, a search request may be initiated automatically by the deleted data restoration logic 108. Upon receipt (block 404, FIG. 7) of the search request and associated specified search parameters, the deleted data restoration logic 108 determines (block 440, FIG. 7) whether a target storage space parameter has been specified. If not, the entire unallocated storage space of the storage system may be scanned (block 444, FIG. 7) by scanning logic 450 (FIG. 2) which is configured to scan the storage space of the storage system, track by track, to identify records, tracks or other data subunits which meet the specified search parameters. In one embodiment, allocated storage space in addition to or instead of unallocated storage space may be searched (block 444), depending upon the particular application. In this manner, in response to the search request, scanning of data subunits of storage space including one or both of allocated and unallocated storage space of the storage system, is initiated to identify storage space locations of scanned storage space meeting specified search parameters of the search request.

For example, if a particular data string (field 486, FIG. 8) was specified as a target data parameter, the scanning logic 450 (FIG. 2) scans the storage space of the storage system, track by track, to identify records, tracks or other data subunits which contain the specified target data string. Although the scanning logic 450 is described in this embodiment as scanning the storage space of the storage system on a track by track basis, it is appreciated that scanning may be performed on the basis of other storage subunits such as cylinders, extents, blocks, records, etc.

Conversely, if the deleted data restoration logic 108 determines (block 440, FIG. 7) that one or more target storage space parameters have been specified, the scope of the search may be limited to the specified target storage space or spaces of the storage system which are scanned (block 448, FIG. 7) by the scanning logic 450 (FIG. 2) to identify records, tracks, extents or other storage space subunits which meet the specified search parameters. In this manner, the search of the storage space of the storage system may be limited to a specified volume or volumes, specified extent or extents, specified track or tracks, specified record or records, etc. For example, if a particular data string was specified as a target data parameter, the search of the scanning logic 450 (FIG. 2) is limited to the specified target storage space in which the scanning logic scans the specified target storage space, track by track, to identify records, tracks or other data subunits which contain the specified target data string. Here too, the search may be limited to unallocated storage space of the specified storage space. Alternatively, allocated storage space in addition to or instead of unallocated storage space may be searched (block 448, FIG. 7)) of the specified storage space, depending upon the particular application.

The scanning logic 450 is further configured to determine (block 452, FIG. 7) whether any of the scanned tracks (or other data subunits) have been identified as candidates meeting or satisfying the specified target data search parameter or parameters. If so, tracks, extents or other data subunits identified as candidates which satisfy the specified search parameters may optionally be displayed (block 454) and/or printed by a search result output device 460, FIG. 8, of the user interface 408, for visual inspection by a user.

The deleted data restoration logic 108 (FIG. 2) is further configured to receive (block 470) a selection or selections of records, extents or other data subunits from the candidates which were identified by the search as meeting the specified search parameters. Such selections may in one embodiment, be input manually by a user through a suitable search result input selection field 464 of the user interface 408. For example, a user may highlight a displayed candidate record, track, extent or other data subunit or subunits of the search results which contained the specified data string, to select an extent or set of extents for purposes of restoration (block 474, FIG. 7) of the deleted data set. In other embodiments, selections may be input through a keyboard or other suitable input device.

It is appreciated that in some embodiments, the deleted data restoration logic 108 may be configured to automatically select an extent or set of extents from candidate data subunits for purposes of restoration of the deleted data set, as a function of the search results which identified one or more candidate records, tracks, extents or other data subunit or subunits of the search results which contained the specified data string. It is further appreciated that the operations of blocks 404-454 may be performed iteratively, repeating the operations of blocks 404-454 until the search results have been sufficiently narrowed or broadened to facilitate selection of a candidate extent or set of extents for purposes of restoration (block 474, FIG. 7) of the deleted data set, as a function of the candidate search results. Thus, a target data parameter or a target storage space parameter, or both, may be narrowed, for example, to narrow the search results to a narrower range of candidate extents for restoration of the deleted data set. Similarly, a target data parameter or a target storage space parameter, or both, may be changed or broadened, for example, to change the search results to a more suitable range of candidate extents for restoration of the deleted data set.

In response to receipt (block 470, FIG. 7) of a selection of extents or other data subunits which were identified in connection with the search as meeting the specified search parameters, the deleted data restoration logic 108 is further configured to rebuild (block 474, FIG. 7) the pointers and other metadata which were erased by the inadvertent data set deletion process, to restore, that is, undelete, the data set. In this manner, identifying metadata associated with identified storage space locations are restored, to undelete a data unit such as a data set so that restored identifying metadata remaps storage space locations identified as a result of the search, to the now undeleted data set or other data unit of the storage system. In the example of FIG. 8, the user interface 408 includes an "undelete" request field 472 by which a user may manually initiate restoration of metadata to undelete a data set. Alternatively, in some embodiments, metadata restoration and the resultant undeleting of the data set may be initiated automatically by the deleted data restoration logic 108, in response to receipt of the selection of extents or other data subunits which were identified in connection with the search as meeting the specified search parameters.

As previously mentioned, in the z/OS operating system, pointers to the data sets are maintained within Data Set Control Block (DSCB) records in the Volume Table of Contents (VTOC). Accordingly, in such embodiments, the deleted data restoration logic 108 is configured to rebuild (block 474, FIG. 7) the pointers and other metadata which were erased by the inadvertent data set deletion process, into the appropriate locations of the VTOC to restore, that is, undelete, the data set. As a result, the access to the data set is restored so that host applications using the restored pointers may readily access the user data of the undeleted data set, using the restored VTOC metadata.

It is appreciated that various software tools may be utilized by the deleted data restoration logic 108 to rebuild erased data set location pointers based upon data extents selected as a function of search results provided by the data restoration logic 108. For example, a utility tool marketed as a "ZAP" tool may be used to rebuild data set pointers within Data Set Control Block (DSCB) records in the Volume Table of Contents (VTOC). Other restoration tools may be utilized, depending upon the particular application.

In another aspect of deleted data restoration in accordance with the present description, it is appreciated that other target data or storage space parameters may be specified to facilitate a search for the extents which store the user data of a deleted data set. For example, if the user knew that a data string to be searched for resided only at a particular record number or position of the track such as the first record of the track for example, that record number or record position may be specified by the user using a suitable input field 432 (FIG. 8) of the user interface 408. The resultant search (block 448, FIG. 7) may then be limited to the specified record number or position of each track of the scan.

As another example, the user may know that the user data of the deleted data set has a particular format value such as a key length value, for example, in volumes formatted in a count key data format, for example. The known key length value such as a key length of zero, for example, may be specified by the user using a suitable input field 482 (FIG. 8) of the user interface 408. The resultant search (block 448, FIG. 7) may then be limited to data records having the specified key length value in each track of the scan.

In yet another example, the user may know that the user data of the deleted data set has a data string of a particular length such as 27,998 bytes, for example. The known data string length value may be specified by the user using a suitable input field 486 (FIG. 8) of the user interface 408. The resultant search (block 448, FIG. 7) may then be limited to data records having the specified data string length in each track of the scan.

It is further appreciated that multiple search parameters may be used in combination to limit the storage areas being searched to facilitate efficient searches. For example on a volume formatted for count key data records, if the user knew that the data string to be searched for only resides on the first record of the track, that the data had a key length of zero, and a data length of 27,998, these values may be specified through the user interface to be used as search parameters or criteria. The track scanning logic 450 (FIG. 2) of the data restoration logic 108 limits the search to read the tracks that the user specified, only looking at Record R0 (FIG. 6*c*) of each track, and only Record R0's that had a key length of zero and a data length of 27,998, to determine if the specified records contained the specified data string.

As yet another example, the user may not know the contents of a particular data string to be searched for, but may know that the data string to be searched for may only reside on a particular record of a track, in which the particular record has a particular character string at a particular position of the record such as the first eight characters of the record, for example. The known character string and the known character string position, may be specified by the user using suitable input fields 492 (FIG. 8) and 496, respectively of the user interface 408. In response, the track scanning logic 450 (FIG. 2) of the data restoration logic 108 limits the search to read the tracks that the user specified, only looking at records having the specified character string at the specified character position. It is appreciated that other target data parameters and target storage space parameters may be used in addition to or instead of those depicted and described herein, depending upon the particular application.

It is seen from the above that deleted data restoration logic in accordance with the present description, provides computer systems the capability to restore a data set or other data unit which has been inadvertently deleted. As a result, a significant improvement in computer technology is provided by deleted data restoration in accordance with the present description.

Figure 9:
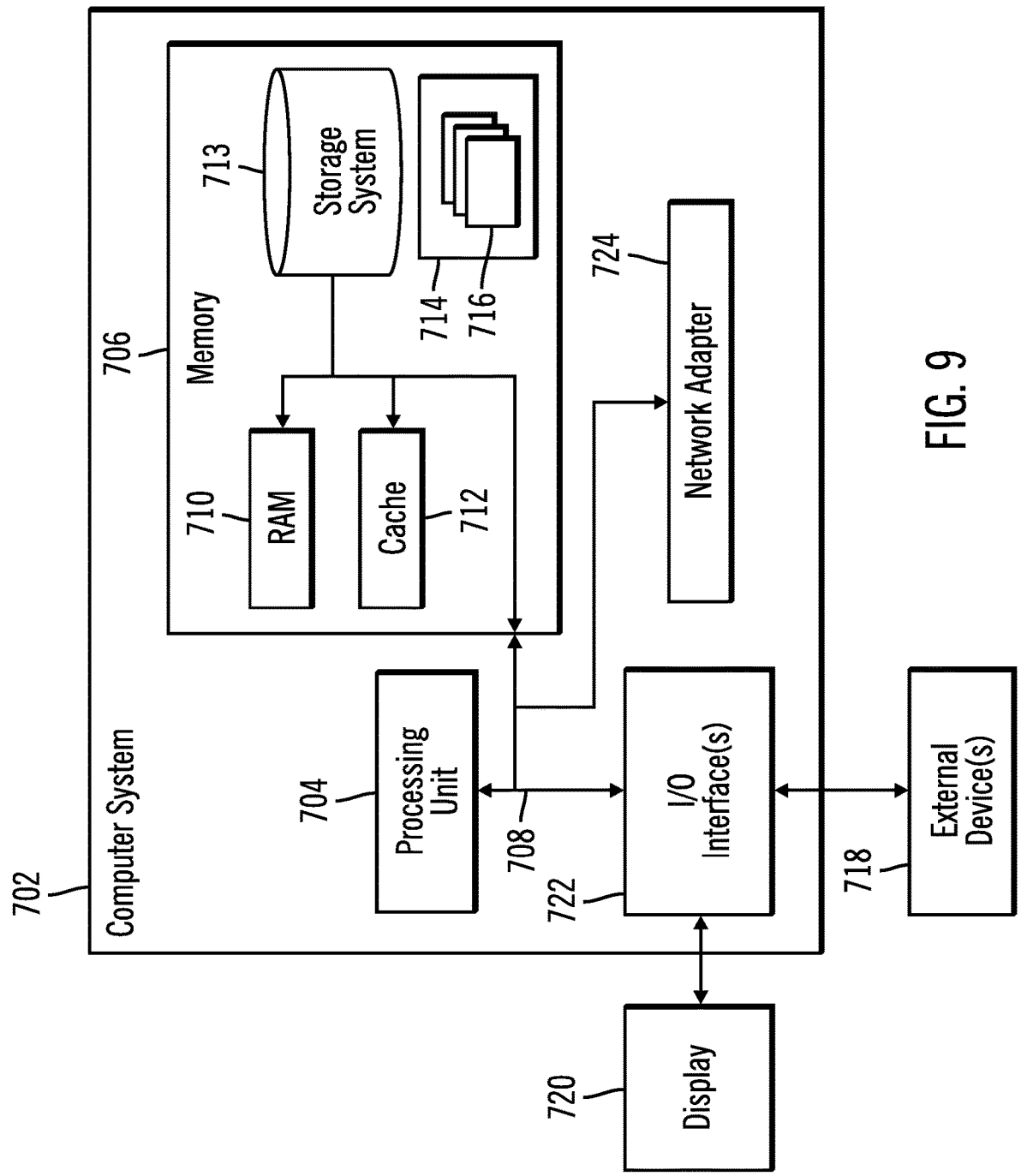
FIG. 9 illustrates an embodiment of a computing environment, employing aspects of deleted data restoration in accordance with the present description.

The computational components of FIGS. 1 and 2, including one or both a host and a storage controller, may each be implemented in one or more computer systems, such as the computer system 702 shown in FIG. 9. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus, FICON, ESCON, or Fibre-Channel or any other suitable network or bus connection or protocol.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIGS. 1A, 1B may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702;

and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising operations of a processor in a host of a computing system having a host and a storage system, the operations comprising:
    receiving a search request to identify data of a data unit of a file deleted from the storage system by erasure of location identifying metadata associated with the deleted data unit wherein erased identifying metadata no longer resides in storage space of the storage system, wherein data of the deleted data unit still resides in storage space of the storage system and wherein the search request includes specified search parameters;
    in response to the search request, scanning data subunits of storage space including unallocated storage space of the storage system to identify storage space locations of scanned storage space meeting specified search parameters of the search request and containing data of the deleted data unit of the file; and
    restoring erased location identifying metadata associated with identified storage space locations to undelete the data unit so that restored location identifying metadata remaps identified storage space locations to the data unit of the storage system wherein the restoring erased identifying metadata includes rebuilding erased location identifying metadata as a function of identified storage space locations to provide rebuilt location identifying metadata identifying a storage space location containing data of undeleted identified storage space records of the data unit of the file;
    wherein erased metadata includes erased pointers which prior to erasure, identified a storage space location containing data of the deleted data unit, and wherein the restoring identifying metadata includes rebuilding erased pointers as a function of identified storage space locations to provide rebuilt pointers identifying a storage space location containing data of undeleted identified storage space records.

2. The method of claim 1 wherein the specified search parameters include a specified data string so that in response to the search request, at least one of allocated and unallocated storage space of the storage system is scanned to identify a storage space location containing the specified data string.

3. The method of claim 1 wherein storage space subunits include storage space tracks, each track including a plurality of storage space records and wherein the specified search parameters include at least one of a specified record number of a record within a track, specified record position of a record within a track, a specified key length of data, and a specified length of data so that in response to the search request, at least one of allocated and unallocated storage space of the storage system is scanned to identify storage space tracks having at least one of a specified record number within a track, specified record position within a track, a specified key length of data, and a specified length of data.

4. The method of claim 3 wherein the specified search parameters further include a specified character string, and a specified position of a specified character string within a record so that in response to the search request, at least one of allocated and unallocated storage space of the storage system is scanned to identify storage space tracks having storage space records having a specified character string at a specified position within a record.

5. The method of claim 4 wherein the specified search parameters further include a specified data string so that in response to the search request, identified storage space tracks having storage space records having a specified character string at a specified position within a record are scanned to identify a storage space track containing the specified data string.

6. A computer program product for a host of a computing system having a host and a storage system wherein the computer program product comprises a computer readable storage medium having program instructions embodied therewith, the program instructions executable by a processor of the host to cause operations, the operations comprising:
receiving a search request to identify data of a data unit of a file deleted from the storage system by erasure of location identifying metadata associated with the deleted data unit wherein erased identifying metadata no longer resides in storage space of the storage system, wherein data of the deleted data unit still resides in storage space of the storage system and wherein the search request includes specified search parameters;
in response to the search request, scanning data subunits of storage space including unallocated storage space of the storage system to identify storage space locations of scanned storage space meeting specified search parameters of the search request and containing data of the deleted data unit of the file; and
restoring erased location identifying metadata associated with identified storage space locations to undelete the data unit so that restored location identifying metadata remaps identified storage space locations to the data unit of the storage system wherein the restoring erased identifying metadata includes rebuilding erased location identifying metadata as a function of identified storage space locations to provide rebuilt location identifying metadata identifying a storage space location containing data of undeleted identified storage space records of the data unit of the file;
wherein erased metadata includes erased pointers which prior to erasure, identified a storage space location containing data of the deleted data unit, and wherein the restoring identifying metadata includes rebuilding erased pointers as a function of identified storage space locations to provide rebuilt pointers identifying a storage space location containing data of undeleted identified storage space records.

7. The computer program product of claim 6 wherein the specified search parameters include a specified data string so that in response to the search request, at least one of allocated and unallocated storage space of the storage system is scanned to identify a storage space location containing the specified data string.

8. The computer program product of claim 6 wherein storage space subunits include storage space tracks, each track including a plurality of storage space records and wherein the specified search parameters include at least one of a specified record number of a record within a track, specified record position of a record within a track, a specified key length of data, and a specified length of data so that in response to the search request, at least one of allocated and unallocated storage space of the storage system is scanned to identify storage space tracks having at least one of a specified record number within a track, specified record position within a track, a specified key length of data, and a specified length of data.

9. The computer program product of claim 8 wherein the specified search parameters further include a specified character string, and a specified position of a specified character string within a record so that in response to the search request, at least one of allocated and unallocated storage space of the storage system is scanned to identify storage space tracks having storage space records having a specified character string at a specified position within a record.

10. The computer program product of claim 8 wherein the specified search parameters further include a specified data string so that in response to the search request, identified storage space tracks having storage space records having at least one of a specified record number within a track, specified record position within a track, a specified key length of data, and a specified length of data, are scanned to identify a storage space track having a storage space record containing the specified data string.

11. The computer program product of claim 9 wherein the specified search parameters further include a specified data string so that in response to the search request, identified storage space tracks having storage space records having a specified character string at a specified position within a record are scanned to identify a storage space track containing the specified data string.

12. A computer system, comprising:
a host;
a storage system coupled to the host; and
a computer program product for at least one of the host and the storage system wherein the computer program product comprises a computer readable storage medium having program instructions embodied therewith, the program instructions executable by a processor of at least one of the host and the storage system to cause operations, the operations comprising:
receiving a search request to identify data of a data unit of a file deleted from the storage system by erasure of location identifying metadata associated with the deleted data unit wherein erased identifying metadata no longer resides in storage space of the storage system, wherein data of the deleted data unit still resides in storage space of the storage system and wherein the search request includes specified search parameters;
in response to the search request, scanning data subunits of storage space including unallocated storage space of the storage system to identify storage space locations of scanned storage space meeting specified search parameters of the search request and containing data of the deleted data unit of the file; and
restoring erased location identifying metadata associated with identified storage space locations to undelete the data unit so that restored location identifying metadata remaps identified storage space locations to the data unit of the storage system wherein the restoring erased identifying metadata includes rebuilding erased location identifying metadata as a function of identified storage space locations to provide rebuilt location identifying metadata identifying a storage space location containing data of undeleted identified storage space records of the data unit of the file;
wherein erased metadata includes erased pointers which prior to erasure, identified a storage space location containing data of the deleted data unit, and wherein the restoring identifying metadata includes rebuilding erased pointers as a function of identified storage space locations to provide rebuilt pointers identifying a storage space location containing data of undeleted identified storage space records.

13. The computer system of claim 12 wherein the specified search parameters include a specified data string so that in response to the search request, at least one of allocated and unallocated storage space of the storage system is scanned to identify a storage space location containing the specified data string.

14. The computer system of claim 12 wherein storage space subunits include storage space tracks, each track including a plurality of storage space records and wherein the specified search parameters include at least one of a specified record number of a record within a track, specified record position of a record within a track, a specified key length of data, and a specified length of data so that in response to the search request, at least one of allocated and unallocated storage space of the storage system is scanned to identify storage space tracks having at least one of a specified record number within a track, specified record position within a track, a specified key length of data, and a specified length of data.

15. The computer system of claim 14 wherein the specified search parameters further include a specified character string, and a specified position of a specified character string within a record so that in response to the search request, at least one of allocated and unallocated storage space of the storage system is scanned to identify storage space tracks having storage space records having a specified character string at a specified position within a record.

16. The computer system of claim 14 wherein the specified search parameters further include a specified data string so that in response to the search request, identified storage space tracks having storage space records having at least one of a specified record number within a track, specified record position within a track, a specified key length of data, and a specified length of data, are scanned to identify a storage space track having a storage space record containing the specified data string.

17. The computer system of claim 15 wherein the specified search parameters further include a specified data string so that in response to the search request, identified storage space tracks having storage space records having a specified character string at a specified position within a record are scanned to identify a storage space track containing the specified data string.

* * * * *